Sept. 22, 1953
L. L. DYER
2,653,038
CONTAINER
Filed April 26, 1952
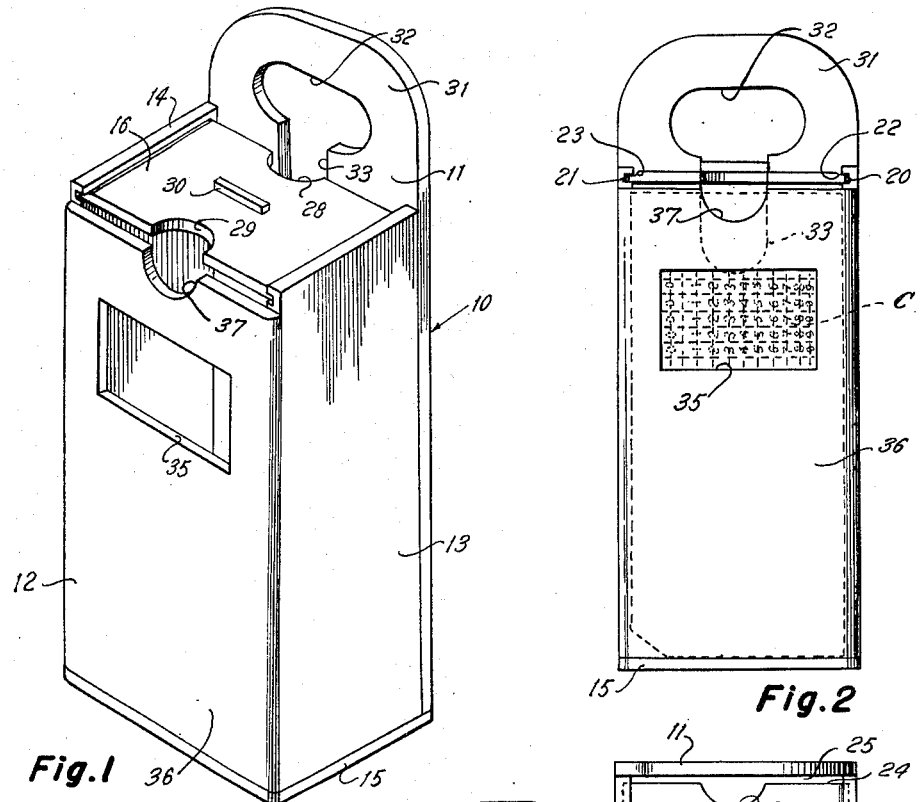
Fig.1
Fig.2
Fig.3
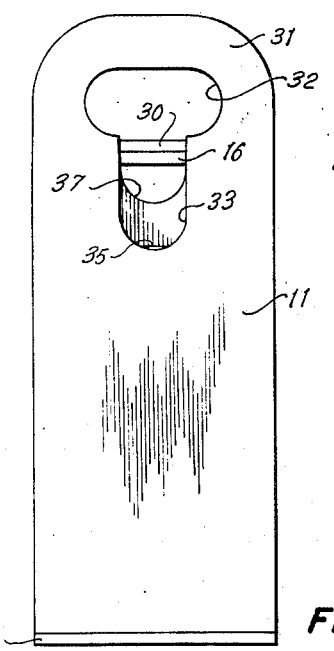
Fig.4
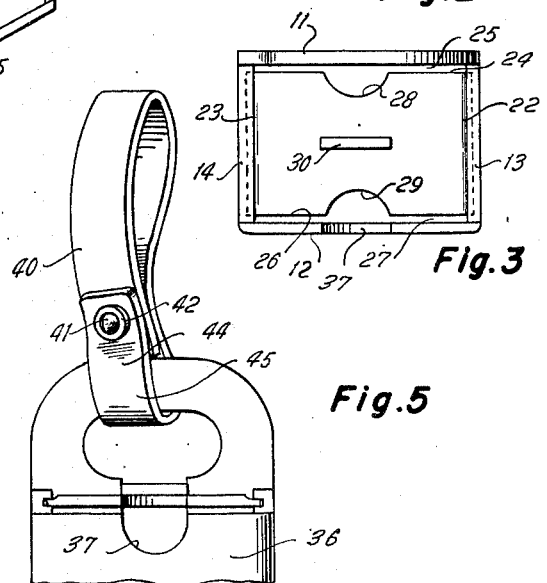
Fig.5
LYMAN L. DYER
INVENTOR.
BY
ATTORNEY Patented Sept. 22, 1953

2,653,038

UNITED STATES PATENT OFFICE 2,653,038

CONTAINER

Lyman L. Dyer, Dallas, Tex.

Application April 26, 1952, Serial No. 284,591

5 Claims. (Cl. 281—44)

This invention relates to new and useful improvements in containers, more especially to writing and carrying cases for use by meter readers and the like. It is particularly directed to a container for holding tabulating cards having indicia printed thereon for marking by the meter reader to indicate the reading of the meter and the quantity of fuel and other material used and recorded on the meter.

As a matter of economy, the practice of recording the index readings of meters on tabulating cards is becoming more prevalent, especially by public utility companies. Each card is marked by the meter reader with a pencil having a special lead, the marks being made on indicia printed on the card in accordance with the indication of the several meter dials. In addition, other factors are noted on the cards, such as skips, dead meters and so forth. The cards which have been marked with the special pencil are then processed in business machines which are designed and constructed to translate the pencilled markings and to punch holes in another portion of the card; and to calculate the quantity of water, gas, electricity or other product consumed and indicated by the meter, and the amount of the bill to be rendered to the customer.

As has been indicated, the present invention has to do particularly with the case which is used by the meter reader for carrying the tabulating meter reading card and for holding the cards while they are being marked. Conventionally, the meter reader visits each meter installation and records the indication of the several meter dials. The meter reader is furnished with a tabulating card for each meter, on which card is noted the meter number and other information to assist the reader in locating the meter, and regarding the particular installation. The meter reader usually arranges the cards in a group in the order in which he intends to route his calls in reading the meters, and the present invention provides for placing the cards in successive order so that the uppermost card is that having to do with the meter being read. After the meter has been read and the indication of the meter dials marked on the card, together with such other information as is required or desirable to mark thereon, the uppermost card is removed from its position and placed at the bottom of the stack of cards, so that the next uppermost card is the one corresponding to the next meter to be read. As the tabulating cards are customarily rectangular but having one corner diagonally cut away, cards to which the particular attention is to be directed may be reversed and inserted in such a manner that one of the rectangular corners is positioned adjacent the usually diagonally cut away corner of the other cards, to facilitate quick reference to such card and ready indication that the card is marked for special attention.

It is, therefore, one object of the invention to provide a new and improved carrying and writing container for tabulating cards for use by meter readers.

It is a particular object of the invention to provide a carrying and writing container, of the character described, provided with an aperture in its face exposing a portion of the tabulating card for marking thereon, and wherein the remainder of the face of the box provides a support for the hand of the user while the card is being marked.

A further object of the invention is to provide a simplified carrying and writing container of the character described wherein the face of the container is transparent so that the information on the face of the card carried thereby is exposed and readable by the user without exposure of the card to the effects of the weather.

Additional objects of the invention are to provide a container of the character described in which the cards may be moved from the uppermost position in the stack to the bottom of the stack without removing the stack from the container, and wherein the cards carried by the container are disposed in such manner that the card is in a position in which it may be readily marked without the necessity of opening a lid or removing the card from the container. Further objects of the invention are to provide a container of the character described which may be used with equal efficiency and facility by either a right-handed or a left-handed person, and which is provided with convenient means for carrying and handling the container in use, and wherein the natural carrying position for the container is such that danger of the cards falling out of the container is eliminated.

Additional objects and advantages of the invention will be readily apparent from the reading of the following description of a device constructed in accordance with the invention, and reference to the accompanying drawings thereof, wherein:

Figure 1 is an isometric view of a carrying and writing container constructed in accordance with the invention, Figure 2 is a front view of the container of Figure 1, illustrating the manner in which a tabulating card is positioned therein for marking through the aperture in the face of the container, Figure 3 is a top plan view of the container of Figure 1, Figure 4 is a back elevation of the container, and Figure 5 is a fragmentary view of the upper end of the rear side of the container showing a carrying strap connected thereto for supporting the container on the belt of the user.

In the drawings, the numeral 10 designates, generally, a carrying and writing card container formed with a back wall 11 and a front wall 12 separated by side walls 13 and 14, respectively, and a bottom end wall 15 closes the lower end of the container. A sliding closure 16 partially closes the open upper end of the container. It is preferable that the back wall, the front wall, the side walls and the bottom wall be rigidly integrally secured together, or formed of a single casting, but they may be secured rigidly together in any manner.

The container is preferably formed of a light weight material, such as plastic, but may be of aluminum or other light weight metal with a transparent front face.

The sliding top end closure 16 is constructed of a flat plate of plastic or other light weight material. The side walls 13 ad 14 project slightly above the upper end of the face or front wall 12 of the container, as clearly shown in Figures 1 and 2, and are provided with transverse grooves 20 and 21, respectively, in their upper ends above the upper end of the front wall. The edges of the slidable closure plate 16 are beveled or cut away, whereby the beveled edges 22 and 23, respectively, of the closure plate will fit in the grooves 20 and 21 and slide therein to substantially close the upper end of the container. The portions of the grooves nearest the back wall 11 may be reduced in size slightly to grip the cover plate 16 when in the position shown in Figures 1 and 2, to limit movement of the cover plate from that position, or, if desired, suitable snap arrangements, such as a dimple in the beveled edges of the cover plate and a recess in the groove on each side of the cover plate may be provided to releasably restrain the cover plate in a position substantially closing the upper open end of the container.

The grooves 20 and 21 terminate short of the rear wall 11 of the container and thus form stops to prevent the sliding cover plate 16 from engaging the rear wall, so that a space 25 is provided between the rear edge of the cover plate and the rear wall 11 of the container. The width of the cover plate is such that, when in the position shown in Figures 1 and 2, the front edge 26 of the cover plate is spaced rearwardly from the front wall 12 of the container to provide an opening or aperture 27 therebetween for a purpose which will be hereinafter described. Arcuate openings or cut-away portions 28 and 29 are formed in the rear edge 24 and the front edge 26 of the cover plate, respectively, as clearly shown in Figure 3. A projecting thumb piece 30 is provided on the upper central portion of the cover plate to facilitate movement of the plate.

The rear wall 11 of the container is formed with an upward extension or handle portion 31 which projects substantially above the upper ends of the side walls 13 and 14 of the container, and a transverse slot 32 is formed in this upward extension to provide a finger opening whereby the user may carry the container easily. The slot 32 is also formed with a reduced downwardly directed portion 33 which extends substantially below the plane of the upper end of the front wall 12 of the container, for purposes which will be hereinafter explained.

The front wall 12 of the container is provided with a rectangular aperture or opening 35 conforming substantially to the size of the portion of the tabulating card on which the meter reader is to mark the index readings of the dials of the meters being read. This aperture is shown as being positioned in the upper portion of the front wall 12, whereby substantially more than half the front wall therebelow forms a hand rest or writing surface 36, which may be used with equal convenience and efficiency by a right-handed or a left-handed person for the purpose of supporting the hand when marking cards contained within the container and exposed through the aperture 35, as will be further explained.

A cut-away portion 37 is formed substantially centrally of the upper end of the front wall 12, to faciliate manipulation of the cards within the container, whereby the card may be gripped by the thumb or finger of the user and removed from within the container.

If desired, a double flexible loop 40, of canvas, leather or other suitable material, may be inserted through the opening 32, whereby the container may be hung from the belt of the user, thereby relieving both hands for other use or purposes, if desired or necessary. The double loop 40 is formed by inserting a snap pin rivet 42 through one end and the central portion of the flexible material to form an upper loop 43. The other end 44 of the double loop is provided with a snap socket 41 whereby a lower loop 45 is formed when the snap socket is engaged with the snap rivet 42. The lower end portion 44 of the double loop is inserted through the finger opening 32 and when the snap fastener is engaged over the snap rivet, the container may be supported on the belt of the user, which is inserted through the upper loop 43. Thus, the user is able to free his hands for other purposes, if desired. When it is again desired to use the container, the snap fastener 41 may be released from the rivet 42 and the lower loop 45 disengaged from the opening 32, whereby the container is free of the supporting loops and is available for use.

In use, the removable cover plate 16 is slid out of the grooves in the upper ends of the side walls of the container, whereby the entire upper end of the container is opened. The user then inserts a stack of tabulating cards C (Figure 2) into the open end of the container with the indicia bearing portion of the cards positioned in substantial alignment with the aperture 35 in the face or front wall of the container. Any number of cards may be used in the container, as it is not necessary that the container be full of cards for proper use. If there are fewer than a full container of cards, the uppermost card may be raised into engagement with the under side of the front wall 12 of the container by pressure of the finger through the lower portion of the opening 33 in the rear or back wall of the container. This will bring the cards into position adjacent the aperture 35, whereby the meter reader or user may mark the card in the usual manner to record the dial indication or other information on the card.

When the uppermost card has been marked and it is desired to record the readings of another meter, the uppermost card is slid outwardly through the opening 27 between the front wall 12 and the front edge 26 of the cover plate, and inserted through the opening 24 between the back wall 11 and the rear edge 24 of the cover plate on the bottom of the stack of cards in the container. The newly exposed uppermost card may then be marked and the operation repeated until the entire stock of cards has been suitably marked.

Since the front wall 12 of the container is preferably formed of clear transparent plastic or similar material, it is obvious that any printed matter or other information appearing on the face of the uppermost card in the container or box will be legible through such front wall of the container. Furthermore, in use, the hands of the user may rest on the rest surface 36 adjacent the marking aperture 35, whereby suitable, legible marks may be made on the card. Also, due to the positioning of the card marking aperture and the rest surface, either a right-handed user or a left-handed user may satisfactorily and efficiently use the container for marking cards. Since the container is supported by the carrying opening 32 at the upper end of the rear wall of the container, it is obvious that the cards cannot slip out through the closed bottom end wall 15 of said container. Furthermore, the upper end of the container is substantially closed by the slidable closure 16 which retains the cards in place in the box and prevents their being damaged by bending or moisture or other deleterious matter. The double supporting belt loop 40 also provides for carrying the container between intervals of use, whereby the meter reader or other user may have the free use of both hands for other purposes at certain times during the course of reading or while walking from one location to another. By making the container out of plastic or similar material, a light weight, rigid and inexpensive marking container has been provided which will maintain the cards in good condition and permit the proper marking and handling of the cards during the meter reading.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A carrying and writing container including: a body having a front wall, a back wall, side walls, a fixed bottom end wall and a removable top end closure plate; said front wall having an external flat writing and rest surface formed thereon and having an aperture formed therein communicating with the interior of the body and disposed adjacent the top end of said body; there being a space between the end closure plate and the front wall of the body, and an opening between said closure plate and the back wall of the body, said space and opening each being co-extensive with such body wall to permit insertion and removal of flat rectangular cards through said space; an upward extension on said back wall projecting beyond the side walls and the top end closure plate and having an opening therein, said opening being substantially T-shaped and having a grip portion extending transversely of the back wall and above the upper surface of the top end closure plate, said opening also having a downward extension disposed substantially opposite the upper portion of the aperture in the front wall.

2. A container for substantially rectangular cards comprising: a bottom, a front wall, a rear wall, and two side walls, said walls extending perpendicularly from said bottom, said front wall and said rear wall being disposed parallel to one another, said side walls being disposed parallel to one another and perpendicular to said front and rear walls, said front wall being provided with a substantially rectangular aperture adjacent the upper end thereof to expose a selected area of a card disposed in said container, said rear wall having an aperture opposite the aperture in said front wall whereby a finger may be inserted into the container to move a card toward the front aperture.

3. A container for substantially rectangular cards comprising: a bottom, a front wall, a rear wall, and two side walls, said walls extending perpendicularly from said bottom, said front wall and said rear wall being disposed parallel to one another, said side walls being disposed parallel to one another and perpendicular to said front and rear walls, said front wall being provided with a substantially rectangular aperture adjacent the upper end thereof to expose a selected area of a card disposed in said container, said rear wall having an aperture opposite the aperture in said front wall whereby a finger may be inserted into the container to move a card toward the front aperture, and a top removably secured to said side walls and disposed parallel to said bottom, said top being narrower than said bottom whereby slots exist on opposite sides of said top between said top and the upper ends of said front and rear walls through which cards may be removed from or inserted into said container.

4. A container for substantially rectangular cards comprising: a bottom, a front wall, a rear wall, and two side walls, said walls extending perpendicularly from said bottom, said front wall and said rear wall being disposed parallel to one another, said side walls being disposed parallel to one another and perpendicular to said front and rear walls, said front wall being provided with a substantially rectangular aperture adjacent the upper end thereof to expose a selected area of a card disposed in said container, said rear wall having an aperture opposite the aperture in said front wall whereby a finger may be inserted into the container to move a card toward the front aperture, and a top removably secured to said side walls and disposed parallel to said bottom, said top being narrower than said bottom whereby slots exist on opposite sides of said top between said top and the upper ends of said front and rear walls through which cards may be removed from or inserted into said container, said rear wall extending upwardly beyond the top and having a transverse aperture therein joining the finger aperture in said rear wall and forming means for holding said container.

5. A receptacle having a cavity for receiving substantially rectangular cards and holding them in stacked relation comprising: a substantially rectangular bottom, a front wall, a rear wall, and a pair of side walls extending upwardly from said bottom, said front wall being provided with an aperture adjacent its upper end, said aperture exposing a predetermined area of a card positioned immediately adjacent said front wall in said cavity, said front wall being of substantially larger size than said aperture to provide a hand rest surface adjacent said aperture, said rear wall being provided with a finger aperture substantially opposite said aperture in said front wall whereby a finger may be inserted in said finger aperture to move cards in said cavity toward said front wall, said rear wall extending upwardly beyond said front and side walls and having a transverse gripping and supporting aperture therein disposed above the upper ends of said front and side walls and joined with said finger aperture in said rear wall, whereby the finger of the user may travel without obstruction in the apertures from the gripping and supporting aperture to the finger aperture.

LYMAN L. DYER.

References Cited in the file of this patent

UNITED STATES PATENTS

| Number | Name | Date |
|---|---|---|
| 601,144 | Howe | Mar. 22, 1898 |
| 839,201 | Richter | Dec. 25, 1906 |
| 1,099,214 | Sterling | June 9, 1914 |
| 1,126,139 | Walker | Jan. 26, 915 |
| 2,169,999 | Guilday et al. | Aug. 22, 1939 |
| 2,532,053 | Bickel | Nov. 28, 1950 |
| 2,538,084 | Collings | Jan. 16, 1951 |
| 2,602,574 | Mangold et al. | July 8, 1952 |